United States Patent
Koiwa et al.

(10) Patent No.: US 10,400,970 B2
(45) Date of Patent: Sep. 3, 2019

(54) VEHICLE FRONT LAMP

(71) Applicant: PANASONIC INTELLECTUAL PROPERTY MANAGEMENT CO., LTD., Osaka (JP)

(72) Inventors: Hiroko Koiwa, Osaka (JP); Naoko Takei, Osaka (JP); Yoko Matsubayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 19 days.

(21) Appl. No.: 15/711,632

(22) Filed: Sep. 21, 2017

(65) Prior Publication Data
US 2018/0087731 A1 Mar. 29, 2018

(30) Foreign Application Priority Data
Sep. 27, 2016 (JP) .................................. 2016-188800

(51) Int. Cl.
*F21V 21/10* (2006.01)
*F21S 41/141* (2018.01)
(Continued)

(52) U.S. Cl.
CPC .............. *F21S 41/141* (2018.01); *B60Q 1/06* (2013.01); *F21S 41/125* (2018.01);
(Continued)

(58) Field of Classification Search
CPC ........ B60Q 1/06; F21S 41/125; F21S 41/141; F21S 41/143; F21S 41/147; F21S 41/151;
(Continued)

(56) References Cited

U.S. PATENT DOCUMENTS 8,905,607 B2 * 12/2014 Sato .................... B60Q 1/24
362/507
2011/0273891 A1 11/2011 Lin
2011/0273897 A1 11/2011 Kojima et al.

FOREIGN PATENT DOCUMENTS

| JP | 2008-204727 A | 9/2008 |
| JP | 2011-165341 A | 8/2011 |
| JP | 2013-118146 A | 6/2013 |

OTHER PUBLICATIONS

The CIE 1997 Interim Colour Appearance Model (Simple Version), CIECAM97s, Apr. 1998; cited in specification.
(Continued)

*Primary Examiner* — Jason M Han
(74) *Attorney, Agent, or Firm* — McDermott Will & Emery LLP (57) ABSTRACT

A vehicle front lamp that emits light forward includes a first light emitter that emits first emission light having a correlated color temperature of at least 3000 K and at most 7000 K, and a second light emitter that emits second emission light having a correlated color temperature of at least 3000 K and at most 7000 K. The chroma value of the first emission light is lower than the chroma value of the second emission light. The chroma value of each of the first emission light and the second emission light is derived by using the calculation method stipulated in The CIE 1997 Interim Color Appearance Model (Simple Version). The second emission light is emitted far ahead and the first emission light is emitted onto a road surface ahead, when the vehicle front lamp is mounted on a vehicle.

8 Claims, 8 Drawing Sheets

(51) Int. Cl.
*B60Q 1/06* (2006.01)
*F21V 15/01* (2006.01)
*F21S 41/125* (2018.01)
*F21S 41/143* (2018.01)
*F21S 41/25* (2018.01)
*F21S 41/663* (2018.01)
*F21S 41/147* (2018.01)
*F21W 102/18* (2018.01)

(52) U.S. Cl.
CPC ............ *F21S 41/143* (2018.01); *F21S 41/25* (2018.01); *F21S 41/663* (2018.01); *F21V 15/01* (2013.01); *F21S 41/147* (2018.01); *F21W 2102/18* (2018.01)

(58) Field of Classification Search
CPC ........ F21S 41/176; F21S 41/25; F21S 41/663; F21V 15/01
USPC ................................ 362/507, 510, 543–545
See application file for complete search history.

(56) References Cited

OTHER PUBLICATIONS

"Handbook of Color Science", 3rd Edition, edited by The Color Science Association of Japan, University of Tokyo Press, Apr. 15, 2011, p. 632-633; with partial English translation; cited in specification.

\* cited by examiner

|  | EMBODIMENT EXAMPLE | COMPARATIVE EXAMPLE | CHARACTERISTICS OF EMBODIMENT EXAMPLE OVER COMPARATIVE EXAMPLE |
|---|---|---|---|
| CORRELATED COLOR TEMPERATURE | 6500 K | 5500 K | GOOD VISIBILITY OF WHITE COLOR OF, E.G., WHITE LINES ON ROAD |
| S/P RATIO | 2.2 | 1.8 | GOOD BRIGHTNESS IN CENTRAL AND PERIPHERAL VISION |
| CHROMA VALUE | 2.2 | 3.2 | GOOD VISIBILITY OF WHITE COLOR OF, E.G., WHITE LINES ON ROAD |

VEHICLE FRONT LAMP

CROSS REFERENCE TO RELATED APPLICATION

This application claims the benefit of priority of Japanese Patent Application Number 2016-188800 filed on Sep. 27, 2016, the entire content of which is hereby incorporated by reference.

BACKGROUND

1. Technical Field

The present disclosure relates to a vehicle front lamp.

2. Description of the Related Art

Conventionally, increased brightness of a vehicle headlamp (vehicle front lamp) is desired so as to enable nighttime driving that is equivalent to daytime driving.

However, human visual sensitivity differs in each of photopic scotopic vision, and mesopic vision. Photopic vision (vision in bright environments) allows color perception mediated by cone cells. In scotopic vision (vision in dark environments), cone cells are nonfunctional and thus color perception is not possible, but visual sensitivity is increased by rod cells.

Moreover, mesopic vision (vision in low-light but not quite dark environments) is a combination of photopic vision and scotopic vision, and both cone cells and rod cells are functional. Human mesopic light levels are said to range from approximately 0.01 to 10 lx. Light levels brighter than these are said to be photopic, and light levels darker than these are said to be scotopic.

Here, the visual sensitivity peak in dark environments is shorter wavelength than the visual sensitivity peak in bright environments. This phenomenon is known as the Purkinje effect. Moreover, cone cells are predominantly found in the central region of the retina and extremely decrease in number with distance from the central region, while rod cells are absent in the central region of the retina and sharply increase in number from with distance from the center. Accordingly, in mesopic environments, drivers of vehicles typically visually recognize the roadway regions of the road in central vision and visually recognize the sidewalk regions of the road in peripheral vision.

In view of this, a vehicle headlamp designed with the above described human visual sensitivity in mind has been proposed (for example, see Japanese Unexamined Patent Application Publication No. 2011-165341).

Japanese Unexamined Patent Application Publication No. 2011-165341 discloses a vehicle headlamp that includes a light source that emits light in a predetermined white color range, more specifically, light having a color temperature of from 4500 K to 7000 K or of from 5000 K to 6000 K. Moreover, the four coordinate values indicating predictions of perceptions of four colors (red, green, blue, and yellow) of the light are included in a circular region having a radius of 5 whose center point is at coordinates R(41.7, 20.9), G(−39.5, 14.3), B(8.8, −29.9), Y(−10.4, 74.2) in an a*-b* coordinate system corresponding to the CIE1976 (L*, a*, b*) color space.

This makes it possible to improve driver visibility of, for example, pedestrians or obstacles in areas around the driving environment.

SUMMARY

However, there are times when it is necessary for the driver of the vehicle to simultaneously recognize different visual objects, such as simultaneously recognizing achromatic colors such as the white line on the road and recognizing chromatic colors, which have color information, of, for example, signs.

In light of this, the present disclosure provides a vehicle front lamp that increases visibility even for different visual objects.

A vehicle front lamp according to one aspect of the present disclosure emits light forward and includes: a first light emitter that emits first emission light having a correlated color temperature of at least 3000 K and at most 7000 K; and a second light emitter that emits second emission light having a correlated color temperature of at least 3000 K and at most 7000 K. The chroma value of the first emission light is lower than the chroma value of the second emission light. The chroma value of each of the first emission light and the second emission light is derived by using the calculation method stipulated in The CIE 1997 Interim Color Appearance Model (Simple Version). The second emission light is emitted far ahead and the first emission light is emitted onto a road surface ahead, when the vehicle front lamp is mounted on a vehicle.

With the vehicle front lamp according to the present disclosure, visibility can be increased even for different visual objects.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

The following describes a vehicle front lamp according to an embodiment with reference to the drawings. Note that the embodiment described below shows a general or specific example of the present disclosure. The numerical values, shapes, materials, elements, the arrangement and connection of the elements, etc., indicated in the following embodiment are mere examples, and therefore do not intend to limit the present disclosure. Therefore, among elements in the following embodiment, those not recited in any of the independent claims defining the broadest inventive concept are described as optional elements.

Note that the figures are schematic drawings, and are not necessarily exact depictions. In the figures, elements having essentially the same configuration share like reference numbers. Accordingly, overlapping descriptions thereof are omitted or simplified.

In the description, "forward" refers to the direction in which light is emitted from the vehicle front lamp (light emission direction), and is also the direction in which light is extracted (i.e., lighting direction). Moreover, "forward" is the direction of travel when the vehicle equipped with the vehicle front lamp travels forward.

Moreover, in the description, the Y axis extends vertically, and the negative direction along the Y axis may be referred to as "downward" or "below". Moreover, the positive direction along the Z axis may be referred to as "forward". Moreover, the X axis and the Z axis are orthogonal to one another in a plane perpendicular to the Y axis (i.e., a horizontal plane).

Note that in the description, the term "approximately" includes deviations within manufacturing or placement margins of errors.

Embodiment (Vehicle Front Lamp Configuration)

The vehicle front lamp according to the embodiment will be described with reference to FIG. 1 and FIG. 2.

The vehicle front lamp according to the embodiment is installed in a vehicle to emit light in the direction of travel of the vehicle, and emits light onto the surface of the road or signs on the road. The vehicle front lamp is used in, for example, an automobile, a motorcycle, or a bicycle.

Figure 1:
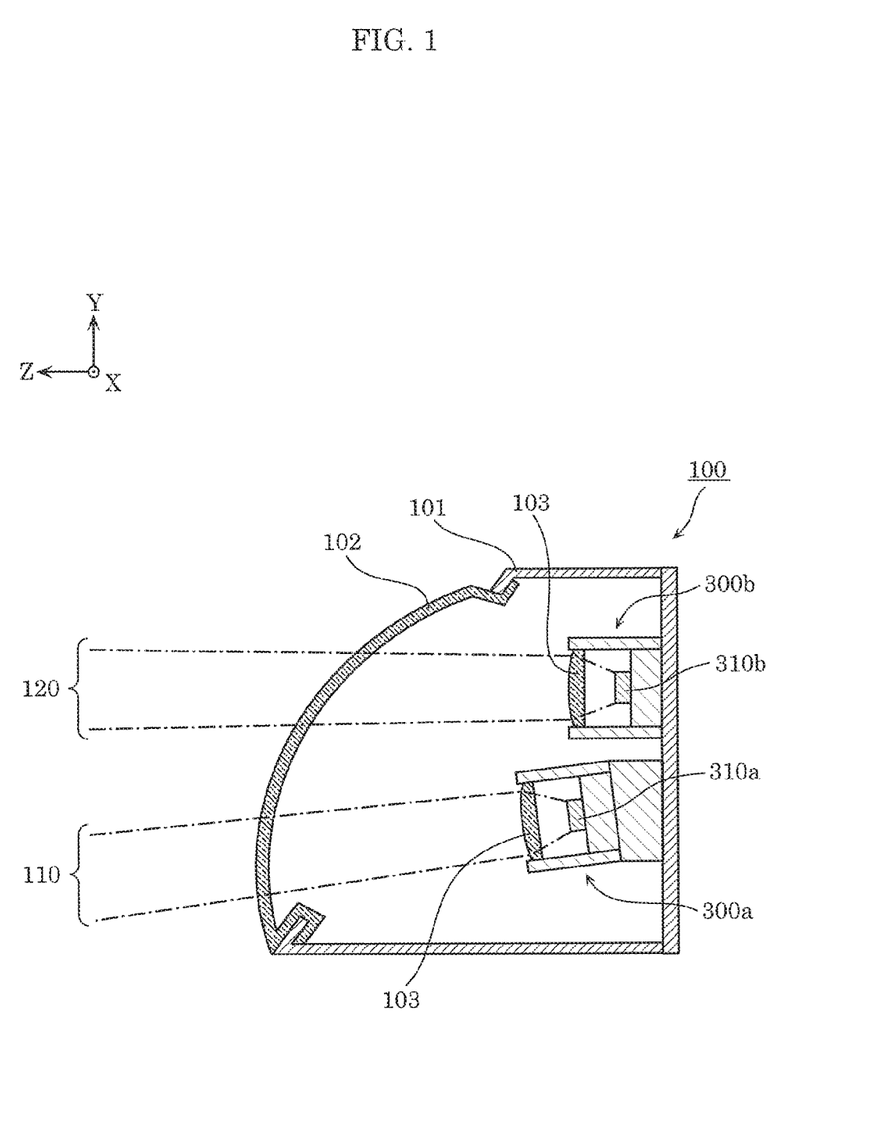
FIG. 1 is a schematic cross sectional view illustrating the internal configuration of a vehicle front lamp according to an embodiment.

FIG. 1 is a cross sectional view illustrating the internal configuration of the vehicle front lamp according to the embodiment. As illustrated in FIG. 1, vehicle front lamp 100 includes housing 101, light-transmissive cover 102, first light emitter 300a, and second light emitter 300b.

Housing 101 houses first fight emitter 300a and second light emitter 300b, and holds light-transmissive cover 102 that transmits light from first light emitter 300a and second light emitter 300b.

Light-transmissive cover 102 is a cover component that transmits light from first light emitter 300a and second light emitter 300b, and is attached to housing 101. Light-transmissive cover 102 is made of, for example, a glass material or a light-transmissive resin material such as acrylic or polycarbonate.

First light emitter 300a emits, toward the road, first emission light 110, which is white light. More specifically, first emission light 110 is white light having a correlated color temperature of at least 3000 K and at most 7000 K. First light emitter 300a includes at least one illumination light source 310a. An illumination light source is a light source used for lighting purposes.

Illumination light source 310a includes, for example, a light-emitting element and a phosphor that converts the wavelength of a portion of the light from the light-emitting element. Illumination light source 310a will be described in detail later.

First light emitter 300a may include an optical system such as lens 103 for controlling first emission light 110 from illumination light source 310a.

Second light emitter 300b emits, toward, for example, signs on the road or stoplights, second emission light 120, which is white light. More specifically, second emission light 120 is white light having a correlated color temperature of at least 3000 K and at most 7000 K. Second light emitter 300b includes at least one illumination light source 310b.

Illumination light source 310b includes, for example, a light-emitting element and a phosphor that converts the wavelength of a portion of the light from the light-emitting element. Illumination light source 310b will be described in detail later.

First light emitter 300a may include an optical system such as lens 103 for controlling first emission light 110 from illumination light source 310a.

Note that vehicle front lamp 100 is installed in the vehicle such that the positive direction along the Z axis illustrated in FIG. 1 points in the direction of travel of the vehicle and the negative direction along the Y axis illustrated in FIG. 1 points toward the surface of the road.

Next, the illumination range of the light from the vehicle front lamp according to the embodiment will be described.

Figure 2:
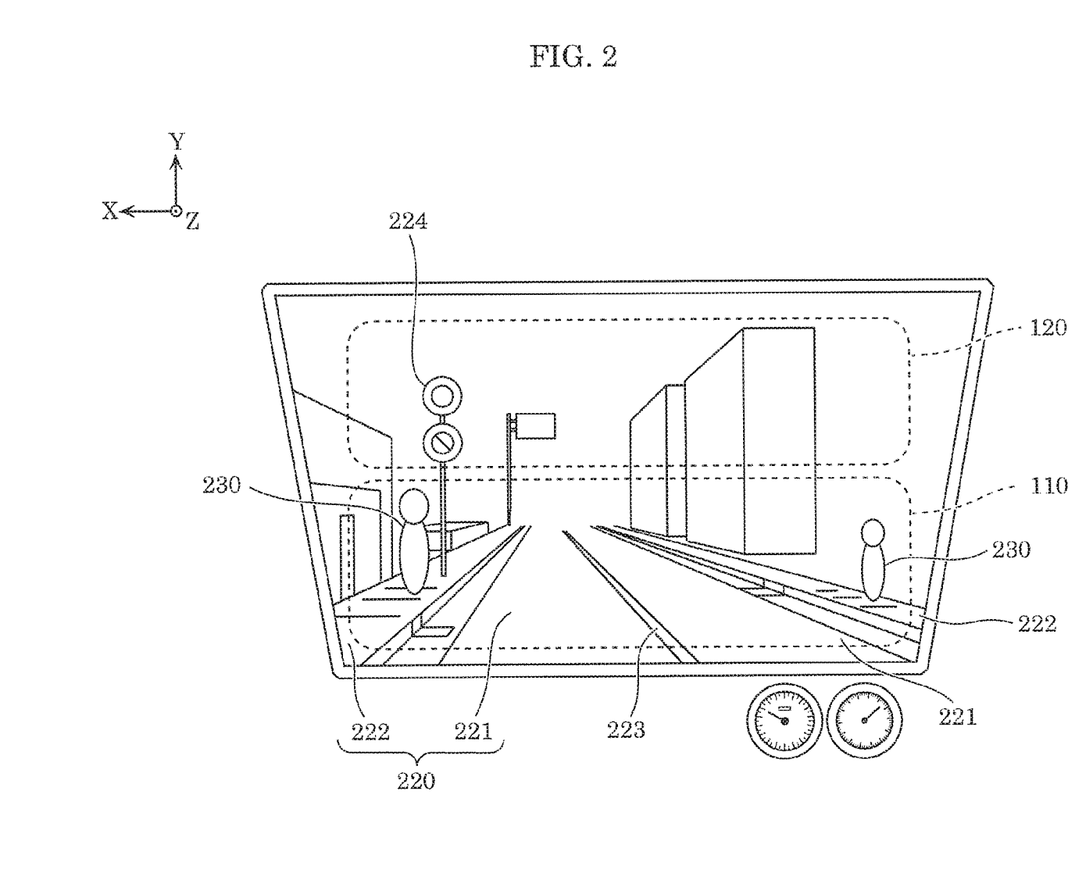
FIG. 2 is a schematic view illustrating the illumination range of light from a vehicle front lamp according to an embodiment.

FIG. 2 is a schematic view illustrating the illumination range of the light from the vehicle front lamp according to the embodiment. Note that FIG. 2 schematically illustrates a view in the direction of travel from inside the vehicle when being driven. As illustrated in FIG. 2, first light emitter 300a included in vehicle front lamp 100 emits first emission light 110 onto the surface of road 220 including roadway 221 and sidewalk 222. More specifically, first light emitter 300a emits first emission light 110 onto white line 223 on roadway 221 and onto pedestrians 230 walking on sidewalk 222. In other words, first light emitter 300a emits first emission light 110 so as to illuminate an area in front of (in the direction of travel of) the vehicle equipped with vehicle front lamp 100. Note that in FIG. 2, first emission light 110 is emitted so as to illuminate the region surrounded by the dashed line indicating first emission light 110 (first illumination region). Moreover, the first illumination region described, above covers a range extending to half the maximum light intensity in the first illumination region.

Moreover, second light emitter 300b included in vehicle front lamp 100 emits light further vertically upward relative to road 220 than first emission light 110. More specifically, second light emitter 300b emits light onto, for example, sign 224 on road 220. Note that in FIG. 2, second emission light 120 is emitted so as to illuminate the region surrounded by the dashed line indicating second emission light 120 (second illumination region). Moreover, the second illumination region described above covers a range extending to half the maximum light intensity in the second illumination region.

First light emitter 300a includes illumination light source 310a (to be described later), and emits light that increases visibility in mesopic environments. With this, in mesopic environments or photopic environments, light that increases the visibility of, for example, white line 223 to the driver is emitted onto road 220 in the illumination range of first emission light 110 from first light emitter 300a.

Moreover, first light emitter 300a emits light of the same color onto roadway 221 and sidewalk 222. With this, first light emitter 300a can reduce color irregularity of roadway 221 and sidewalk 222 more so than when the light emitted onto roadway 221 and the light emitted onto sidewalk 222 are different colors. Accordingly, to the driver, first emission light 110 appears to naturally and evenly cover the entire space.

Second light emitter 300b includes illumination light source 310b (to be described later) and emits second emission light 120 having an increased feeling of contrast index (FCI). Here, the feeling of contrast index is an index for evaluating how vivid the color of an illuminated object illuminated by a given light source appears. The feeling of contrast index will be described in detail later.

With this, in the illumination range of second emission light 120 from second light emitter 300b, colors of the illuminated object are rendered vividly, thereby increasing the feeling of contrast. In, other words, visual objects whose color information (chromatic color) is pertinent for the driver to recognize, such as sign 224 or stoplights, become easier to recognize.

Here, in vehicle front lamp 100 according to the embodiment that emits light forward (in the direction of travel of the vehicle), second emission light 120 is emitted far ahead and first emission light 110 is emitted onto the road surface ahead. Stated differently, second light emitter 300b emits second emission light 120 in a direction approximately parallel to the road surface ahead, rather onto the road surface itself. In other words, second light emitter 300b emits second emission light 120 so as to illuminate sign 224 above the road surface ahead. Moreover, first light emitter 300a emits first emission light 110 to illuminate the surface of road 220.

For example, assume that a screen is placed on and vertical to the road surface at a position a predetermined distance (for example, 25 meters) from the front of vehicle front lamp 100. When first emission light 110 and second emission light 120 are emitted toward the screen, first emission light 110 illuminates an area on the screen below the area illuminated by second emission light 120. More specifically, the position on the screen at which the illuminance of first emission light 110 is the highest is lower (i.e., closer to the road surface) than the position on the screen at which the illuminance of second emission light 120 is highest.

In other words, the region illuminated by second emission light 120 from second light emitter 300b (the second illumination region) is located vertically higher than the region illuminated by first emission light 110 from first light emitter 300a (the first, illumination region). Note that the first illumination region and the second illumination region described above may partially overlap one another.

Moreover, the chroma value (to be described later) of first emission light 110 is lower than the chroma value of second emission light 120. More specifically, the chroma value of first emission light 110 may be, for example, less than or equal to 2.7. Moreover, second emission light 120 has a feeling of contrast index that is higher than a feeling of contrast index of first emission light 110. More specifically, for example, when the correlated color temperature of second emission light 120 is at least 3000 K and at most 7000 K, second emission light 120 has a feeling of contrast index that is at least 110.

With this, vehicle front lamp 100 can simultaneously emit first emission light 110 and second emission light 120 from first light emitter 300a and second light emitter 300b included in vehicle front lamp 100 and emit light suitable for different visual objects. This makes it easier for the driver to visually recognize a visual object illuminated by light from vehicle front lamp 100.

Detailed description of the desired properties of first emission light 110 and second emission light 120 will be given later.

(Illumination Light Source Configuration)

Next, configurations of illumination light source 310a and illumination light source 310b will be described with reference to FIG. 3 through FIG. 5. Note that illumination light source 310a and illumination light source 310b according to the present disclosure may include essentially the same elements; it is sufficient so long as first emission light 110 and second emission light 120 each have the characteristics to be described later. Accordingly, in the present disclosure, a specific example in which illumination light source 310a and illumination light source 310b have the same configuration will be given as illumination light source 310.

Figure 3:
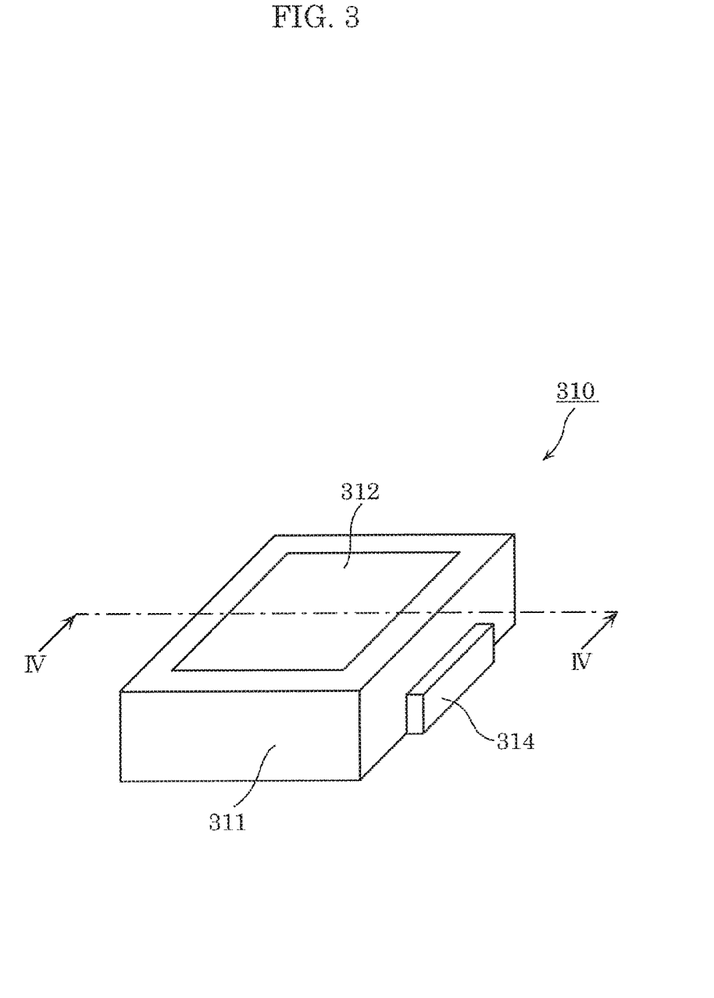
FIG. 3 is an external perspective view of an illumination light source according to an embodiment.

FIG. 3 is an external perspective view of illumination light source 310 according to the embodiment. FIG. 4 is a schematic cross sectional view of illumination light source 310 taken at line IV-IV in FIG. 3.

Figure 4:
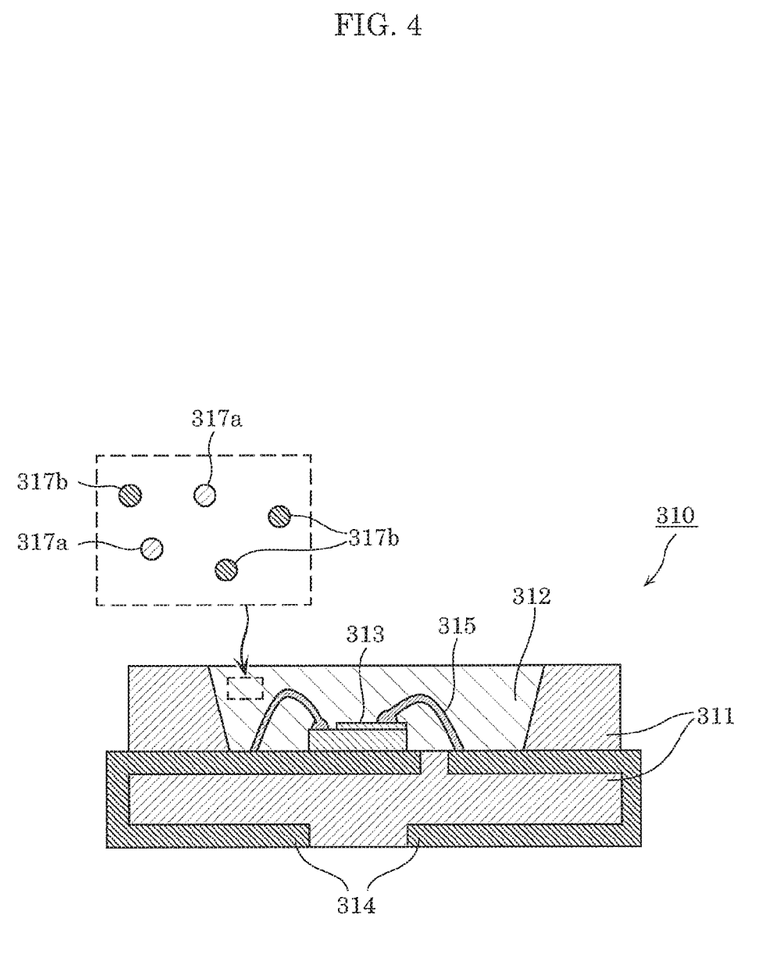
FIG. 4 is a schematic cross sectional view of the illumination light source taken at line IV-IV in FIG. 3.

As illustrated in FIG. 3 and FIG. 4, illumination light source 310 according to the embodiment is realized as a surface mount device (SMD) light-emitting device.

Illumination light source 310 includes package 311 having a cavity, sealant 312 filling the cavity, and light-emitting diode (LED) chip (light-emitting element) 313 mounted in the cavity.

Package 311 is a container for housing LED chip 313 and sealant 312. Package 311 includes electrode 314, which is a metal electrical line for supplying power to LED chip 313. LED chip 313 and electrode 314 are electrically connected via bonding wire 315. The material of package 311 is not particularly limited, and is, for example, a metal, ceramic or resin material. Note that the inner surface of package 311 in which LED chip 313 is arranged may be treated so as to increase reflectivity.

LED chip 313 is one example of the light emitting element, and is a blue LED chip that emits blue light. LED chip 313 is a nitride gallium LED chip made of indium gallium nitride (InGaN) and has a central wavelength (emission spectrum peak wavelength) that is at least 430 nm and at most 460 nm Sealant 312 seals at least part of LED chip 313, electrode 314, and bonding wire 315. Sealant 312 includes a wavelength converter that converts the wavelength of a portion of the light from LED chip 313. More specifically, sealant 312 is made of a light-transmissive resin material including, as wavelength converters, green phosphor particles 317a and red phosphor particles 317b. The light-transmissive resin material is not limited to a particular material. For example, a methyl based silicone resin, an epoxy resin, or a urea resin may be used.

Green phosphor particles 317a are one example of the phosphor particles, and are excited by the blue light from LED chip 313 and emit green light which is different in wavelength from the blue light from LED chip 313.

Here, in illumination light source 310a, first emission light 110 emitted by illumination light source 310a has an increased S/P ratio. Note that S/P ratio is an evaluation index for visibility in mesopic environments. The higher the S/P ratio is, the higher the visibility achieved by the light in mesopic environments is. Here, in order to increase the S/P ratio, it is effective to increase the color components in the blue-green wavelength range from 480 nm to 520 nm, inclusive. In order to increase the color components in the above blue-green wavelength range, it is effective, from the perspective of wavelength conversion efficiency, to use $Ce^{3+}$-activated oxide phosphor. Specific properties of first emission light 110 will be described in detail later.

Figure 5:
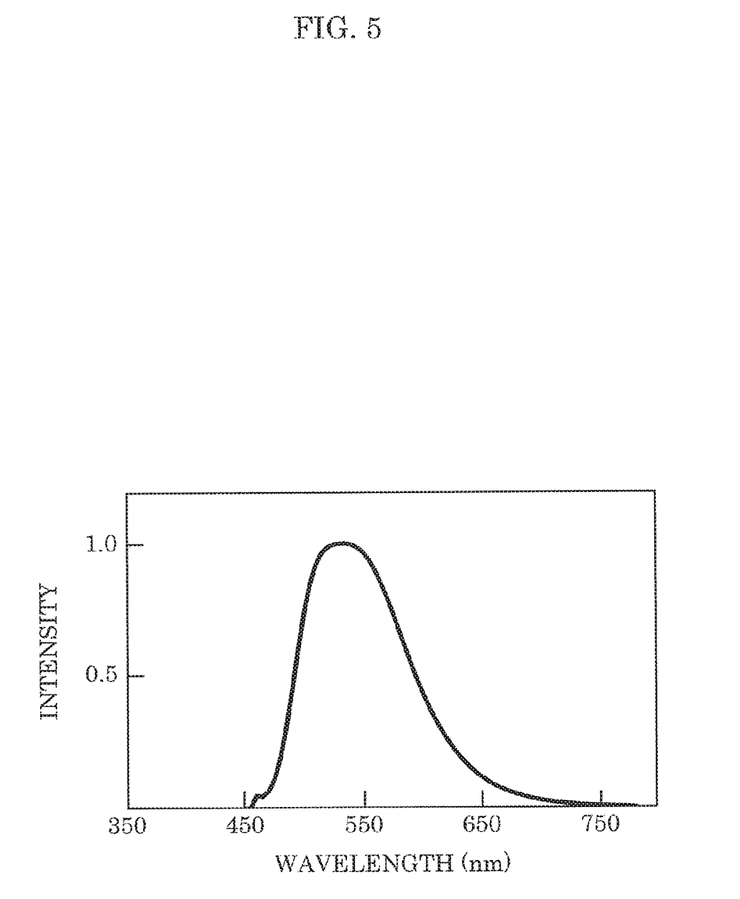
FIG. 5 illustrates one example of a fluorescent spectrum of a green phosphor according to an embodiment.

FIG. 5 illustrates the fluorescent spectrum of $Ce^{3+}$-activated oxide phosphor used as the green phosphor. Note that FIG. 5 illustrates the fluorescent spectrum of a $Lu_3Al_5O_{12}$:$Ce^{3+}$ phosphor, which is one example of the $Ce^{3+}$-activated oxide phosphor used for green phosphor particles 317a.

As illustrated in FIG. 5, the fluorescent spectrum of the $Lu_3Al_5O_{12}$:$Ce^{3+}$ phosphor has a central wavelength of at least 540 nm and at most 550 nm. Note that relative intensity (in an arbitrary unit) is represented on the vertical axis and light wavelength (in units of nm) is represented on the horizontal axis in FIG. 5, and the peak intensity of the fluorescent spectrum is standardized to 1.0.

When a $Lu_3Al_5O_{12}:Ce^{3+}$ phosphor is used and the central wavelength is less than 540 nm wavelength conversion efficiency decreases. Moreover, a central wavelength of greater than 550 nm has a deteriorating effect on the increase in color components in the blue-green wavelength range—that is to say, on the increase in the S/P ratio. Therefore, in this embodiment, a $Lu_3Al_5O_{12}:Ce^{3+}$ phosphor having a central wavelength of at least 540 nm and at most 550 nm is used.

Note that if a decrease in photoconversion efficiency is permissible, any phosphor that can yield the emission spectrum to be described later may be used for green phosphor particles 317a. For example, a yttrium aluminum garnet (YAG) phosphor may be used for green phosphor particles 317a. Moreover, for example, a halosilicate phosphor may be used for green phosphor particles 317a. Moreover, for example, an oxynitride phosphor may be used for green phosphor particles 317a.

Red phosphor particles 317b are one example of the phosphor particles, and are excited by the blue light from LED chip 313 and emit red light which is different in wavelength from the blue light from LED chip 313. In illumination light source 310a, for example, a $(Sr,Ca)AlSiN_3:Eu^{2+}$ phosphor having a central wavelength of at least 610 nm and at most 620 nm is used for red phosphor particles 317b. Note that any phosphor that can yield the emission spectrum to be described later may be used for red phosphor particles 317b.

Moreover, in illumination light source 310b, so long as the properties of second emission light 120 that will be described later can be realized, any phosphor may be used for green phosphor particles 317a and red phosphor particles 317b.

With the above configuration, a portion of the blue light from LED chip 313 is wavelength converted, into green light by green phosphor particles 317a included in sealant 312. Similarly, a portion of the blue light from LED chip 313 is wavelength converted into red light by red phosphor particles 317b included in sealant 312. Then, the blue light not absorbed by green phosphor particles 317a or red phosphor particles 317b, the green light wavelength converted by green phosphor particles 317a, and the red light wavelength converted by red phosphor particles 317b diffuse and mix in sealant 312, This results in white light being emitted from sealant 312. In other words, illumination light source 310 emits white light as a result of the light from LED chip 313, the light from green phosphor particles 317a, and the light from red phosphor particles 317 mixing.

This concludes the description of the configurations of illumination light source 310a and illumination light source 310b.

(Details Regarding First Emission Light)

Figure 6:
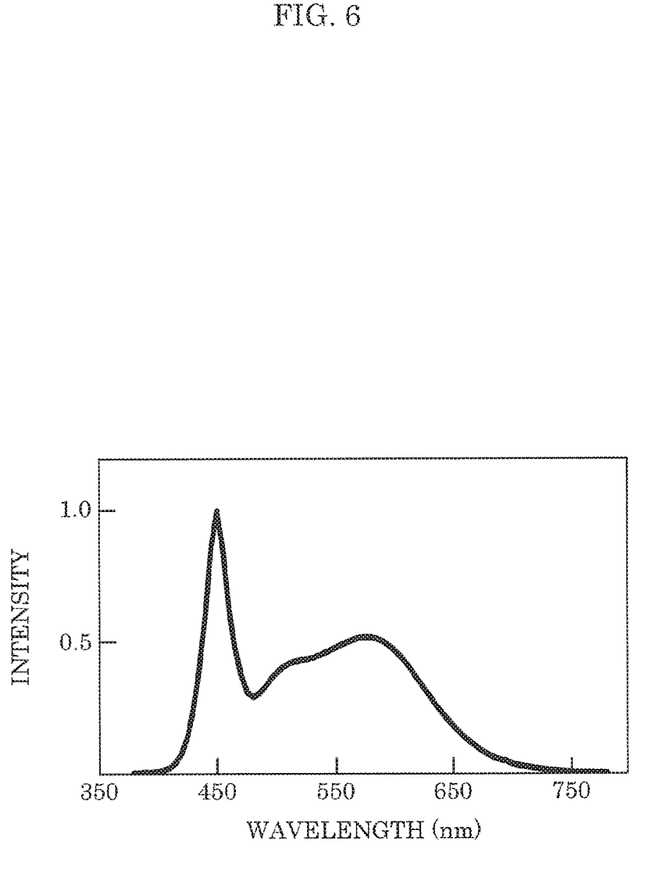
FIG. 6 illustrates the emission spectrum of a first emission light in an example according to the embodiment.

Next, the emission spectrum of first emission light 110 emitted by illumination light source 310a will be described with reference to an example according to the embodiment and a comparative example.

FIG. 6 illustrates the emission spectrum of illumination light source 310a in the example according to the embodiment. Note that in the emission spectrum illustrated in FIG. 6, light intensity at 450 nm standardized to 1.0.

Illumination light source 310a in the example according to the embodiment includes LED chip 313 exhibiting a peak wavelength at 450 nm, green phosphor particles 317a ($Lu_3Al_5O_{12}:Ce^{3+}$ phosphor particles) exhibiting a peak wavelength at 545 nm, and red phosphor particles 317b ($(Sr,Ca)AlSiN_3:Eu^{2+}$ phosphor particles) exhibiting a peak wavelength at 615 nm.

In illumination light source 310a in the example according to the embodiment, the mixed quantity of green phosphor particles 317a and red phosphor particles 317h is adjusted so as to give first emission light 110 emitted by illumination light source 310a a correlated color temperature of 6500 K. In other words, the correlated color temperature of first emission light 110 emitted by illumination light source 310a in the example according to the embodiment is 6500 K.

Moreover, the chromaticity deviation (Duv) of illumination light source 310a in the example according to the embodiment is 0. Here, chromaticity deviation is the deviation from a color temperature on a black body locus.

Moreover, the S/P ratio, which is a ratio of scotopic luminance to photopic luminance, of first emission light 110 emitted by illumination light source 310a in the example according to the embodiment is 2.2.

Note that S/P ratio is an evaluation index for mesopic environments, as described above. When the photopic spectral luminous efficiency of illumination light source 310a is expressed as $V(\lambda)$ and the scotopic spectral luminous efficiency of illumination light source 310a is expressed as $V'(\lambda)$, S/P ratio ($R_{SP}$) can be calculated based on Equation 1 below.

MATH. 1

$$R_{SP} = \frac{K' \int V'(\lambda)\Phi_e(\lambda)d\lambda}{K \int V(\lambda)\Phi_e(\lambda)d\lambda} \qquad \text{Equation 1}$$

Note that in Equation 1, K is the maximum photopic visual sensitivity (=683 lm/W), K' is the maximum scotopic visual sensitivity (=1699 lm/W), and $\Phi_e(\lambda)$ is the spectral total luminous flux of illumination light source 310a.

Moreover, first emission light 110 has a chroma value, derived by using the calculation method stipulated in The CIE 1997 Interim Color Appearance Model (Simple Version), of 2.2. Here, chrome value is an index for quantitatively evaluating the whiteness of a visual object. A high chroma value indicates a strong color tone and a low chrome value indicates a weak color tone. In other words, a low chroma value indicates a high degree of whiteness. A high degree of whiteness leads to an increase in black and white contrast, which makes it easier to differentiate between white and black.

Moreover, the lumen equivalent (LE) of first emission light 110 is 306 lm/W. Here, lumen equivalent is an index for evaluating visibility per unit of energy, such as light, in photopic vision. Stated differently, light having a high lumen equivalent produces high visibility per unit of light energy in photopic vision, and is light that is easily perceived by cone cells. Further, light having a high lumen equivalent is easily perceived by cone cells even in mesopic vision.

When photopic maximum visual sensitivity (=683 lm/W) is expressed as K, photopic spectral luminous efficiency is expressed as $V(\lambda)$, and spectral total luminous flux of illumination light source 310 is expressed as $\Phi_e(\lambda)$, lumen equivalent can be calculated based on Equation 2 below.

MATH. 2

$$LE = \frac{K \int_{380}^{780} V(\lambda)\Phi_e(\lambda)d\lambda}{\int_{380}^{780} \Phi_e(\lambda)d\lambda}$$ Equation 2

With this, first emission light 110 emitted by illumination light source 310a is easily perceived by cone cells, even in mesopic vision. Accordingly, first emission light 110 emitted by illumination light source 310a is light that, in mesopic vision, efficiently uses light energy for making objects in central and peripheral vision appear bright to the driver.

Figure 7:
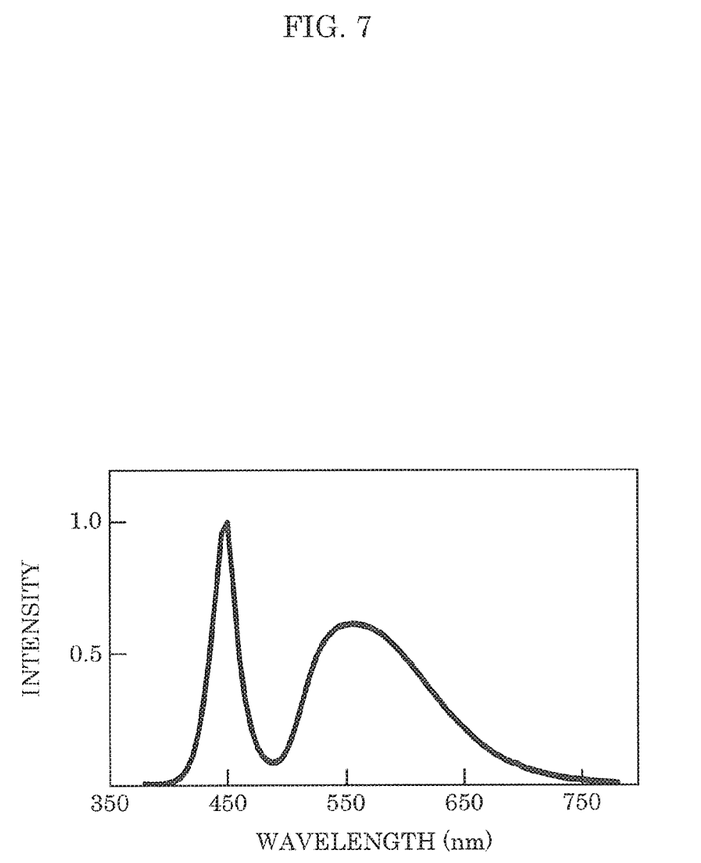
FIG. 7 illustrates the emission spectrum of an illumination light source according to a comparative example.

FIG. 7 illustrates the emission spectrum of an illumination light source according to a comparative example. Note that in the emission spectrum illustrated in FIG. 7, light intensity at 450 nm is standardized to 1.0.

The illumination light source according to the comparative example has the same overall configuration as illumination light source 310, but, the phosphor included in the sealant is different. More specifically, the illumination light source according to the comparative example includes an LED chip exhibiting a peak wavelength at 450 nm and a green phosphor ($Y_3Al_5O_{12}:Ce^{3+}$ phosphor) exhibiting a peak wavelength at 555 nm. The illumination light source according to the comparative example does not include a red phosphor.

In the illumination light source according to the comparative example, the mixed quantity of green phosphor particles is adjusted so as to give the white light emitted by the illumination light source a correlated color temperature of 5500 K. In other words, the correlated color temperature of the white light emitted by the illumination light source according to the comparative example is 5500 K.

The S/P ratio of the white light emitted by the illumination light source according to the comparative example is 1.8. Moreover, the chroma value of the white light emitted by the illumination light source according to the comparative example is 3.2.

Figure 8:
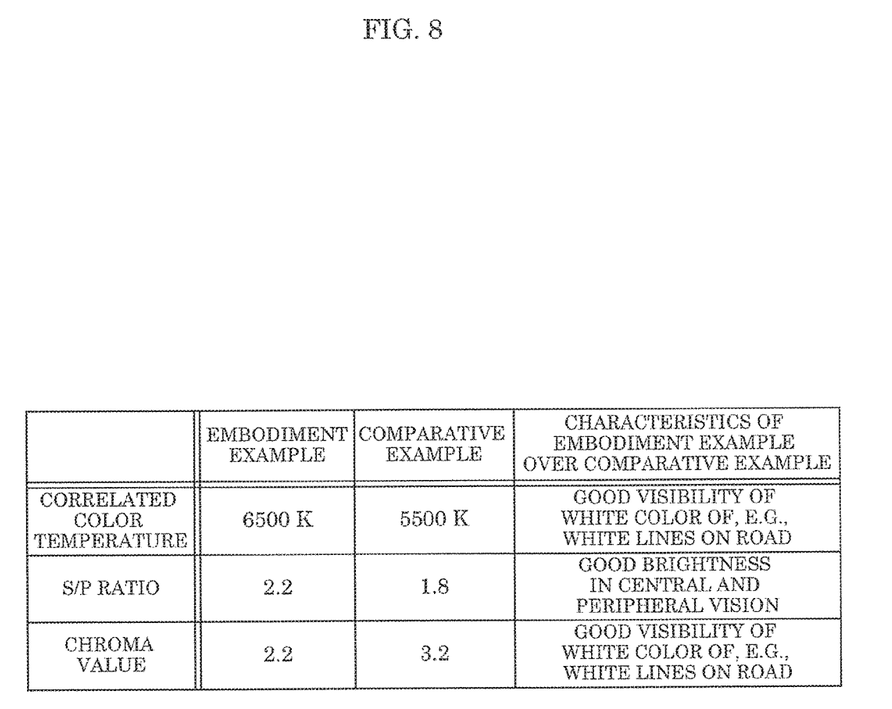
FIG. 8 is a chart comparing the properties of an illumination light source in an example according to the embodiment and an illumination light source according to a comparative example.

The advantageous effects achieved by illumination light source 310a in the example according to the embodiment will be described in comparison to the comparative example.

FIG. 8 is a chart comparing the properties of illumination light source 310a in the example according to the embodiment and the illumination light source according to the comparative example.

The correlated color temperature of first emission light 110 emitted by illumination light source 310a in the example according to the embodiment is 6500 K. In other words, the correlated color temperature of first emission light 110 emitted by illumination light source 310a in the example according to the embodiment is at least 5500 K and at most 7000 K.

With this, illumination light source 310a in the example according to the embodiment can emit light that makes, for example, white line 223 on road. 220 clearly visible and that has a natural white daytime color (daylight color) with muted blue components.

Note that the correlated color temperature of first emission light 110 is at least 6000 K and at most 6500 K. With this, since light components in the blue range (for example, in a wavelength, range from 400 nm to 500 nm, inclusive) in first emission light 110 are further reduced, in, for example, foggy conditions, scattering of first emission light 110 can be inhibited. This further increases driving safety.

The chromaticity deviation of first emission light 110 emitted by illumination light source 310a in the example according to the embodiment is at least −6 and at most +8. With this, first emission light 110 is an even more natural white light, with reduced green or red components.

Note that the chromaticity deviation of first emission light 110 may be at least −5.0 and at most +5.0. With this, first emission light is an even more natural white light, and can make, for example, white line 223 on road 220 even more clearly visible.

Moreover, the emission spectrum of first emission light 110 emitted by illumination light source 310a in the example according to the embodiment has a peak wavelength in a range of from 430 nm to 460 nm, inclusive. Further, as a result of the light emitted from green phosphor particles 317a exhibiting a peak wavelength of 545 nm, the light intensity in the blue-green wavelength range from 480 nm to 520 nm, inclusive, is greater than the light intensity in the same region according to the comparative example.

Under these conditions—that is to say, when the first emission light's emission spectrum exhibits increased light components in the blue-green wavelength range from 480 nm to 520 nm, inclusive, the light has an increased S/P ratio. More specifically, the S/P ratio of first emission light 110 from illumination light source 310a can be made to be at least 2.1.

Note that the S/P ratio increases when the peak wavelength of the light emitted by LED chip 313 is shifted to a longer wavelength. However, shifting the peak wavelength of the light emitted by LED chip 313 to a longer wavelength reduces the light emission efficiency of LED chip 313. Accordingly, the peak wavelength of the light emitted by LED chip 313 is preferably at least 43 nm and at most 460 nm, and more preferably at least 450 nm and at most 460 nm.

Here, in photopic environments, among photoreceptor cells, cone cells have a spectral luminous efficiency peak sensitivity at a wavelength of 555 nm. Moreover, in mesopic environments such as on the road at night, in addition to cone cells, rod cells have a spectral luminous efficiency peak sensitivity at a wavelength of 507 nm. In mesopic environments, since both cone, cells and rod cells are stimulated, the S/P ratio of first emission light 110 emitted by illumination light source 310a can be increased by increasing the light components in the emission spectrum blue-green wavelength range from 480 nm to 520 nm, inclusive.

Note that the S/P ratio of first emission light 110 is preferably at least 2.1. Light whose S/P ratio at least 2.1 is perceived as bright in peripheral vision in particular. Note that peripheral vision means a peripheral region of at least a 10 degree visual angle field of view, and is mainly active in mesopic environments or scotopic environments. Therefore, illumination light source 310a can emit first emission light 110 that is perceived as bright in peripheral vision in mesopic environments.

In contrast, for example, the emission spectrum of the illumination light source according to the comparative example does not satisfy the S/P ratio condition of at least 2.1. With the illumination light source according to the comparative example, visibility decreases in mesopic environments.

Moreover, the chroma value of first emission light 110 emitted by illumination light source 310a in the example according to the embodiment is at most 2.7. With this, first emission light 110 emitted by illumination light source 310a in the example according to the embodiment is light that produces a prominent contrast with respect to visual object illuminated by first emission light 110. In other words, for example, it is easier for the driver to visually recognize the silhouette of, for example, white line 223 on road 220 and pedestrian 230 on sidewalk 222 illuminated by first emission light 110.

In contrast, for example, the chroma value of the illumination light source according to the comparative example does not satisfy the chroma value condition of at most 2.7. With the illumination light source according to the comparative example, visual object contrast is low thereby reducing visibility.

Note that the chroma value of first emission light 110 is preferably at most 2.4. Light having a chroma value of at most 2.4 improves visibility since it produces a prominent contrast with respect to white line 223 on road 220 and pedestrian 230, even in low-light but not quite dark environments, such as on the road at night.

This concludes the description of the properties of first emission light 110 emitted by illumination light source 310a in the example according to the embodiment as well as the advantageous effects achieved by first emission light 110.
(Details Regarding Second Emission Light)

Next, the properties of second emission light 120 emitted by light source 310b will be described.

In recent years, the "feeling of contrast index" has been proposed as an index for evaluating how vivid the color of an illuminated object illuminated by a given light source appears (for example, see Handbook of Color Science, 3$^{rd}$ Edition, edited by The Color Science Association of Japan).

The feeling of contrast index (FCI) values are determined by Equation 3 below, and light having a high feeling of contrast index vividly renders the colors of the illuminated object, thereby increasing the feeling of contrast. Here, "feeling of contrast" indicates how clearly a visual object can be visually recognized in contrast to its surroundings. In other words, a high feeling of contrast, indicates that the visual object is clearly visually recognizable in contrast to its surroundings.

Note that in Equation 3, "$G_{LAB}(T)$" indicates the color gamut surface area determined by the LAB color coordinate system of a four color sample (red, blue, green, and yellow) illuminated by a test light source. Moreover, "$G_{LAB}(D65)$" indicates the color gamut surface area determined by the LAB color coordinate system of the same four color sample under a reference light source D65 (6500 K daylight color temperature).

MATH. 3

$$FCI = \left[\frac{G_{LAB}(T)}{G_{LAB}(65)}\right]^{1.5} \times 100 \quad \text{Equation 3}$$

For example, in a comparison of how color is visualized, the feeling of contrast is equal when a vividly colored object is illuminated by 1000 lx light from a light source having an FCI of 150 and the same object is illuminated by 1500 lx light from a light source having an FCI of 100.

Moreover, if light having a high FCI and light having a low FCI have the same color, achromatic colors such as white, grey or black, appear equally vivid, but chromatic colors high in saturation such as red or green appear different in degree of vividness. In other words, when the color of the light is white, the vividness of the appearance of the color changes depending on correlated color temperature.

Here, when the correlated color temperature of second emission light 120 from illumination light source 310b is at least 2000 K and less than 3000 K, second emission light 120 preferably has an FCI of at least 120. When the correlated color temperature of second emission light 120 from illumination light source 310b is at least 3000 K and less than 4000 K, second emission light 120 preferably has an FCI of least 110. When the correlated color temperature of second emission light 120 is at least 4000 K and less than 5000 K, second emission light 120 preferably has an FCI of at least 99. When the correlated color temperature of second emission light 120 is at least 5000 K and less than 6000 K, second emission light 120 preferably has an FCI of at least 95. When the correlated color temperature of second emission light 120 is at least 6000 K and at most 7000 K, second emission light 120 preferably has an FCI of at least 83.

This makes it easier for the driver to recognize information displayed in chromatic colors, such as on sign 224.

Note that in order to emit second emission light 120 so as to satisfy the above described correlated color temperature and FCI, for example, the type and/or added amount of phosphor in illumination light source 310b, and/or the amount of blue light emitted by LED chip 313 can be adjusted.

Moreover, the correlated color temperature for second emission light 120 is selected from the above described correlated color temperature range, and the type and/or added amount of phosphor in illumination light source 310b, and/or the amount of blue light emitted by LED chip 313 is adjusted so as to achieve an FCI in accordance with the selected correlated color temperature. Here, for example, when the color tone of second emission light 120 is adjustable, second emission light 120 may have an FCI value that is in accordance with the adjusted correlated color temperature. For example, second light emitter 300b may include a plurality of illumination light sources 310b having different correlated color temperatures.

This concludes the description of the properties of second emission light 120 emitted by illumination light source 310b and the advantageous effects achieved by second emission light 120.

Note that the light emitted by first light emitter 300a and second light emitter 300b included in vehicle front lamp 100 is sufficient if it has the properties and achieves the advantageous effects described above in relation to first emission light 110 and second emission light 120, and is not particularly limited otherwise. For example, when first light emitter 300a or second light emitter 300b include a plurality of illumination light sources 310a or a plurality of illumination light sources 310b, each of them need not have the above properties and achieve the above advantageous effects.

For example, in the vehicle front lamp, the first light emitter and the second light emitter may each include a blue LED chip that emits blue light, and a light-transmissive wavelength converter that contains green and red phosphor. In other words, vehicle front lamp may include, in each of the first and second light emitters, as separate components, a blue LED chip and the above described wavelength converter.

With this, the emission spectrum of the first emission light emitted by first light emitter may be the emission spectrum indicated in the example according to the embodiment, and the second emission light emitted by the second light emitter may be light that satisfies the above described properties.
(Conclusion)

Vehicle front lamp 100 according the embodiment emits light forward and includes: first light emitter 300a that emits first emission light 110 having a correlated color temperature of at least 3000 K and at most 7000 K; and second light emitter 300b that emits second emission light 120 having a correlated color temperature of at least 3000 K and at most 7000 K. The chroma value of first emission light 110 is tower than the chroma value of second emission light 120. The chroma value of each of first emission light 110 and second emission light 110 is derived by using the calculation method stipulated in The CIE 1997 Interim Color Appearance Model (Simple Version). Second emission light 120 is emitted far ahead and first emission light 110 is emitted onto a road surface ahead, when the vehicle front lamp is mounted on a vehicle.

In other words, vehicle front lamp 100 emits different light in upper and lower regions, each being appropriate for different achromatic or chromatic visual objects. This makes it easier for the driver to visually recognize different visual objects in each of the upper and lower regions.

Moreover, the feeling of contrast index of second emission light 120 may be higher than the feeling of contrast index of first emission light 110.

For example, this makes it easier for the driver to recognize information displayed in chromatic colors, such as on sign 224.

Moreover, when the correlated color temperature of second emission light 120 is at least 3000 K and less than 4000 K, second emission light 120 may have a feeling of contrast index that is at least 110. When the correlated color to temperature of second emission light 120 is at least 4000 K and less than 5000 K, second emission light 120 may have a feeling of contrast index that is at least 99. When the correlated color temperature of second emission light 120 is at least 5000 K and less than 6000 K, second emission light 120 may have a feeling of contrast index that is at least 95. When the correlated color temperature of second emission light 120 is at least 6000 K and at most 7000 K, second emission light 120 may have a feeling of contrast index that is at least 83. The chroma value of first emission light 110 may be at most 2.7.

With this, vehicle front lamp 100 emits light appropriate for different visual objects in each of the upper and lower regions. This makes it even easier for the driver to visually recognize different visual objects in each of the upper and lower regions.

Moreover, the correlated color temperature of first emission light 110 may be at least 5500 K and at most 7000 K. First emission light 110 may have a chromaticity deviation Duv of at least −6 and at most 8. First emission light 110 may have an S/P ratio of at least 2.1. The S/P ratio is a ratio of scotopic luminance to photopic luminance. The chroma a value of first emission light 110 may be at most 2.4.

This makes it easier for the driver to visually recognize the state of the surface of the road across a wide range, even at night. In other words, it is easier for the driver to notice information on road 220, such as white line 223. Moreover, when the direction in which the driver is looking shifts between roadway 221 and sidewalk 222, since both roadway 221 and sidewalk 222 are illuminated by the same light, the driver is less likely to get a feeling of strangeness evoked by differences in color between roadway 221 and sidewalk 222.

Moreover, First light emitter 300a may include illumination light source 310a. Illumination light source 310a may include: light-emitting element 313; and a phosphor particles that are excited by light from light-emitting element 313 and emit light of a wavelength different from the light from light-emitting element 313. Light-emitting element 313 may have a peak wavelength in a range of from 430 nm to 460 nm, inclusive.

In other words, for example, light-emitting element 313 is applied as LED chip 313 exhibiting a peak wavelength in a range of from 430 nm to 460 nm, inclusive. This makes it possible for illumination light source 310 to emit light that is easily perceived in both peripheral and central vision and that has improved color rendering properties.

Moreover, the phosphor particles may include a $Ce^{3+}$-activated oxide phosphor particle exhibiting a peak wavelength in a range of from 540 nm to 550 nm, inclusive.

In other words, for example, $Ce^{3+}$-activated oxide phosphor having a high photoconversion efficiency in the blue-green wavelength range is used as the phosphor. This makes it possible for illumination light source 310 to efficiently emit light that is easily perceived in both peripheral and central vision and that has improved color rendering properties.

Moreover, the phosphor particles may include a $(Sr, Ca)AlSiN_3:Eu^{2+}$ phosphor particle exhibiting a peak wavelength in a range of from 610 nm to 620 nm, inclusive.

In other words, for example, $(Sr, Ca)AlSiN_3:Eu^{2+}$ phosphor having a high photoconversion efficiency in the red wavelength range is used as the phosphor. This makes it possible for illumination light source 310 to emit light that is easily perceived in both peripheral and central vision and that has improved color rendering properties.

(Other Embodiments)

Hereinbefore, the vehicle front lamp according to the embodiment was described, hut the present disclosure is not limited to the above embodiment.

In the above embodiment, the structure of the vehicle front lamp illustrated in FIG. 1 is merely one non-limiting example. As illustrated in FIG. 2, the vehicle front lamp may merely be structured so as to emit light having the above-described properties regarding the road surface side and the road sign, etc., side. The vehicle front lamp may include, for example, a mirror to adjust the emission direction of the light. Moreover, the vehicle front lamp illustrated in FIG. 1 is configured so as to house first light emitter and second light emitter in a single housing and therefore be integral, but the configuration of the vehicle front lamp is not limited to this example. The first light emitter and the second light emitter may be configured as separate components.

Moreover, in the above embodiment, two types of phosphors are used to achieve the above-described emission spectrum using a single LED chip (light-emitting element), but this method is merely one example. For example, any phosphor and/or light-emitting element may be used so long as the above conditions are satisfied.

For example, in the example according to the embodiment, an LED chip is given as one specific example of the light-emitting element, but a semiconductor light-emitting element such as a semiconductor laser, or a solid state light-emitting element such as an organic or inorganic electroluminescent (EL) element may be used as the light-emitting element. Moreover, for example, the illumination light source may include three or more types of phosphors that have different central fluorescent wavelengths. In either case, so long as the above emission spectrum conditions are satisfied, the vehicle front lamp can emit light that is brightly perceivable in both peripheral and central vision.

Moreover, for example, in the above embodiment, the illumination light source is exemplified as being realized as an SMD light-emitting module, but the illumination light source according to the present disclosure may be realized as a chip-on-board (COB) LED module in which an LED chip is mounted directly onto the substrate.

Moreover, the illumination light source according to the present disclosure may be realized as a remote phosphor light-emitting element on which a resin material including phosphor is disposed in a position separated from the LED chip.

Moreover, the first light emitter and the second light emitter according to the present disclosure may be realized as remote phosphor emitters on which a resin material including phosphor is disposed in a position separated from the LED chip.

For example, the first light emitter and the second light emitter may be formed by bifurcating light emitted from a single light source using, for example, a light waveguide or optical fiber. In such cases, the first light emitter and the second light emitter may include a wavelength converter containing phosphor to convert the wavelength of the light from the single light source so as to achieve the properties described above.

Moreover, for example, typical automobiles are equipped with vehicle front lamps that can switch between emitting low and high beams. The light emitted by the vehicle front lamp according to the present disclosure (i.e., the first emission light and the second emission light) may be applied to low beam light and may be applied to high beam light.

Moreover, the vehicle front lamp according to the present disclosure is not limited to any particular shape, structure, and/or size; the vehicle front lamp according to the present disclosure is sufficient so long as it satisfies conditions regarding the light properties described in the above embodiment.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A vehicle front lamp comprising:
a first light emitter configured to emit first emission light having a correlated color temperature of at least 3000 K and at most 7000 K; and
a second light emitter configured to emit second emission light having a correlated color temperature of at least 3000 K and at most 7000 K,
wherein the first emission light has a chroma value that is lower than a chroma value of the second emission light, the chroma value of each of the first emission light and the second emission light being calculated based on an environmental condition of an illuminance of 1000 lx and a correlated color temperature of 5500 K by using the calculation method stipulated in The CIE 1997 Interim Color Appearance Model (Simple Version), and
the vehicle front lamp is configured such that the second emission light is emitted far ahead and the first emission light is emitted onto a road surface ahead, when the vehicle front lamp is mounted on a vehicle.

2. The vehicle front lamp according to claim 1, wherein the second emission light has a feeling of contrast index (FCI) that is higher than a FCI of the first emission light, the FCI of the second emission light and the FCI of the first emission light are measured under a same environmental condition.

3. The vehicle front lamp according to claim 2, wherein the FCI is calculated by based on an environmental condition of an illuminance of 1000 lx and a correlated color temperature of 5500 K:

$$FCI = \left[\frac{G_{LAB}(T)}{G_{LAB}(65)}\right]^{1.5} \times 100$$

where $G_{LAB}(T)$ is a color gamut surface area determined by the LAB color coordinate system of a four color sample including red, blue, green, and yellow illuminated by a test light source, and $G_{LAB}(D65)$ is a color gamut surface area determined by the LAB color coordinate system of the same four color sample under a reference light source D65 having 6500 K daylight color temperature.

4. The vehicle front lamp according to claim 1, wherein
when the correlated color temperature of the second emission light is at least 3000 K and less than 4000 K, the second emission light has a feeling of contrast index (FCI) that is at least 110,
when the correlated color temperature of the second emission light is at least 4000 K and less than 5000 K, the second emission light has a FCI that is at least 99,
when the correlated color temperature of the second emission light is at least 5000 K and less than 6000 K, the second emission light has a FCI that is at least 95,
when the correlated color temperature of the second emission light is at least 6000 K and at most 7000 K, the second emission light has a FCI that is at least 83,
the chroma value of the first emission light is at most 2.7, and
the FCI is calculated by based on an environmental condition of an illuminance of 1000 lx and a correlated color temperature of 5500 K:

$$FCI = \left[\frac{G_{LAB}(T)}{G_{LAB}(65)}\right]^{1.5} \times 100$$

where $G_{LAB}(T)$ is a color gamut surface area determined by the LAB color coordinate system of a four color sample including red, blue, green, and yellow illuminated by a test light source, and $G_{LAB}(D65)$ is a color gamut surface area determined by the LAB color coordinate system of the same four color sample under a reference light source D65 having 6500 K daylight color temperature.

5. The vehicle front lamp according to claim 1, wherein
the correlated color temperature of the first emission light is at least 5500 K and at most 7000 K,
the first emission light has a chromaticity deviation Duv of at least −6 and at most 8,
the first emission light has an S/P ratio of at least 2.1, the S/P ratio being a ratio of scotopic luminance to photopic luminance,
the chroma value of the first emission light is at most 2.4, the S/P ratio $R_{SP}$ is calculated by:

$$R_{SP} = \frac{K' \int V'(\lambda)\Phi_e(\lambda)d\lambda}{K \int V(\lambda)\Phi_e(\lambda)d\lambda}$$

where V(λ) is a photopic spectral luminous efficiency of the first light emitter, V'(λ) is a scotopic spectral luminous efficiency of the first light emitter, and $\Phi_e(\lambda)$ is spectral total luminous flux of the first light emitter.

6. The vehicle front lamp according to claim 1, wherein the first light emitter includes an illumination light source, the illumination light source includes:
   a light-emitting element; and
   phosphor particles that are excited by light from the light-emitting element and emit light of a wavelength different from the light from the light-emitting element, and
the light-emitting element has a peak wavelength in a range of from 430 nm to 460 nm, inclusive.

7. The vehicle front lamp according to claim 6, wherein the phosphor particles include a $Ce^{3+}$-activated oxide phosphor particle exhibiting a peak wavelength in a range of from 540 nm to 550 nm, inclusive.

8. The vehicle front lamp according to claim 6, wherein the phosphor particles include a $(Sr,Ca)AlSiN_3:Eu^{2+}$ phosphor particle exhibiting a peak wavelength in a range of from 610 nm to 620 nm, inclusive.

\* \* \* \* \*